United States Patent
Flick

[19]

[11] Patent Number: 6,152,169
[45] Date of Patent: Nov. 28, 2000

[54] PILOT OPERATED LOW PRESSURE SHUT OFF VALVE

[75] Inventor: Roland E. Flick, Elma, N.Y.

[73] Assignee: Gaymar Industries, Inc., Orchard Park, N.Y.

[21] Appl. No.: 09/294,691

[22] Filed: Apr. 19, 1999

Related U.S. Application Data

[60] Provisional application No. 60/082,403, Apr. 20, 1998.

[51] Int. Cl.[7] .................................................. F16K 31/126
[52] U.S. Cl. ................................................. 137/510; 5/713
[58] Field of Search ...................... 137/510, 509; 5/713

[56] References Cited

U.S. PATENT DOCUMENTS

| | | | |
|---|---|---|---|
| 2,748,797 | 6/1956 | Heizer et al. | 137/510 |
| 3,659,625 | 5/1972 | Colner et al. | 137/510 |
| 4,986,738 | 1/1991 | Kawasaki et al. | 417/304 |
| 5,944,066 | 8/1999 | Viard | 5/713 |

*Primary Examiner*—Stephen M. Hepperle
*Attorney, Agent, or Firm*—Hodgson Russ Andrews Woods & Goodyear LLP

[57] ABSTRACT

The present invention relates to a pilot operated low pressure shut off valve. The valve is used within a mattress unit and has an air inlet, an air chamber, an air outlet, a pressure inlet, an adjustable pressure chamber, and a movable shank. The air inlet receives and directs pressurized air into an air chamber. The air chamber directs the pressurized air into the mattress unit when the movable shank opens the air outlet. The movable shank opens the air outlet when (1) the pressure inlet receives and directs a portion of the pressurized air toward an adjustable pressure chamber and (2) the pressurized air is at or above a first predetermined air pressure. When these two conditions are met, the pressurized air enters the adjustable pressure chamber which results in the movable shank moving which in turn opens the air outlet to allow the pressurized air to enter the mattress unit.

3 Claims, 2 Drawing Sheets

PILOT OPERATED LOW PRESSURE SHUT OFF VALVE

This application claims benefit of Provisional Application Ser. No. 60/082,403, filed Apr. 20, 1998.

FIELD OF THE INVENTION

The present invention relates to a valve, in particular a valve used in a mattress unit.

BACKGROUND OF THE INVENTION

A conventional air mattress system has at least one bladder connected to a manifold unit. The manifold unit delivers air into, and in some instances releases air from, the bladders. This air mattress system, however, has at least one problem. That problem is that when the manifold unit is not delivering air at a certain pressure into the bladders, the pressure on the bladders may be actually and undesirably releasing air from the bladders. The present invention solves this problem.

SUMMARY OF THE INVENTION

The present invention relates to a pilot operated low pressure shut off valve. The valve is used within a mattress unit and has an air inlet, an air chamber, an air outlet, a pressure inlet, an adjustable pressure chamber, and a movable shank. The air inlet receives and directs pressurized air into an air chamber. The air chamber directs the pressurized air into the mattress unit when the movable shank opens the air outlet. The movable shank opens the air outlet when (1) the pressure inlet receives and directs a portion of the pressurized air toward an adjustable pressure chamber and (2) the pressurized air is at or above a first predetermined air pressure. When these two conditions are met, the pressurized air enters the adjustable pressure chamber which results in the movable shank moving which in turn opens the air outlet to allow the pressurized air to enter the mattress unit.

DETAILED DESCRIPTION OF THE INVENTION

Figure 1:
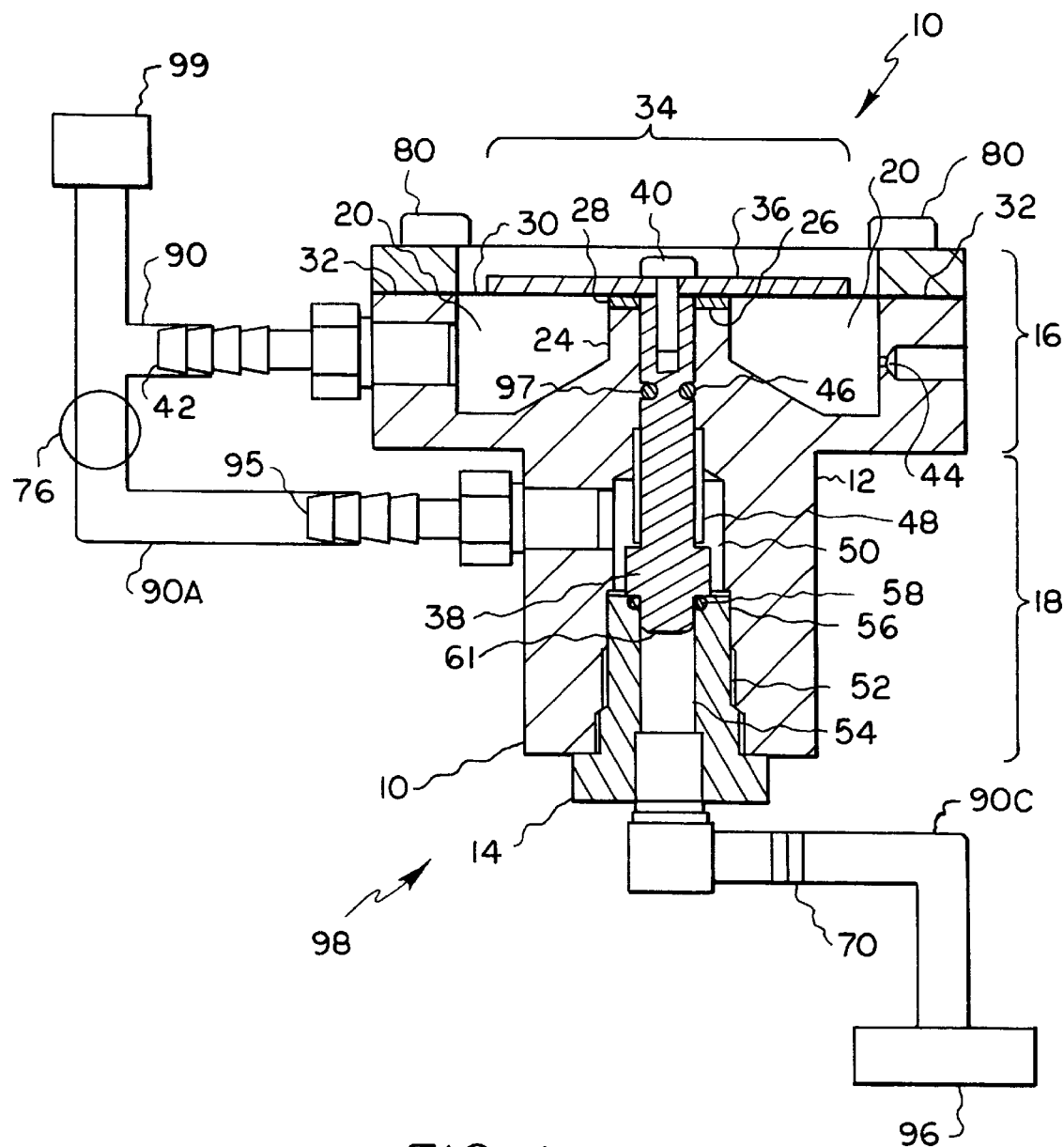
FIG. 1 is a cross-sectional view of the present invention in the closed position.

The present invention is designed to be used within an air mattress unit, referred to only in this application as element 98. There are various versions of air mattress units 98. Applicant does not limit itself to one version of air mattress unit 98 or even mattress overlays, yet as an example, Applicant hereby incorporates by reference one embodiment of this mattress unit 98 which is described in commonly assigned U.S. Pat. No. 5,794,289, which is hereby incorporated by reference. This Patent describes all the elements of the mattress unit 98 including the manifold 99, except a pilot operated low pressure shut off valve 10.

The pilot operated low pressure shut off valve 10 is positioned between the inflatable bladders 96 and the manifold 99, which supplies pressurized air to the bladders 96, are detailed in U.S. Pat. No. 5,794,289. Turning to FIG. 1, the shut off valve 10 is in the closed position. The valve 10 is divided into a pneumatic assembly 12 and a seat assembly 14. The assembly 12 is dividable into two portions, a pressure portion 16 and an air portion 18. The pressure portion 16 is shaped like the letter "W" to form a circular pressure chamber 20. In the center of chamber 20 is a stem 24. And on the top surface 26 of the stem 24 is a washer 28 and on the washer 28 is a diaphragm 30.

When the valve 10 is in the closed position, the diaphragm 30 is the top surface of chamber 20. And when the pressurized air reaches a first predetermined air pressure, the diaphragm 30 expands to form an adjustable pressure chamber 60, shown in FIG. 2.

Returning to FIG. 1, the diaphragm 30 retains the closed position by having sufficient forces applied to the diaphragm 30 to keep it in position. Some of these forces are applied at the outer edges 32 of the diaphragm 30, for example by screws, nails, adhesives, weights, or even combinations thereof 80. Other sources of these forces are applied at the center 34 of the diaphragm 30. This force applied to the center 34 is attained, i.e., by at least a washer 36 secured to a movable shank 38 by a fastening apparatus 40, like a screw.

Figure 2:
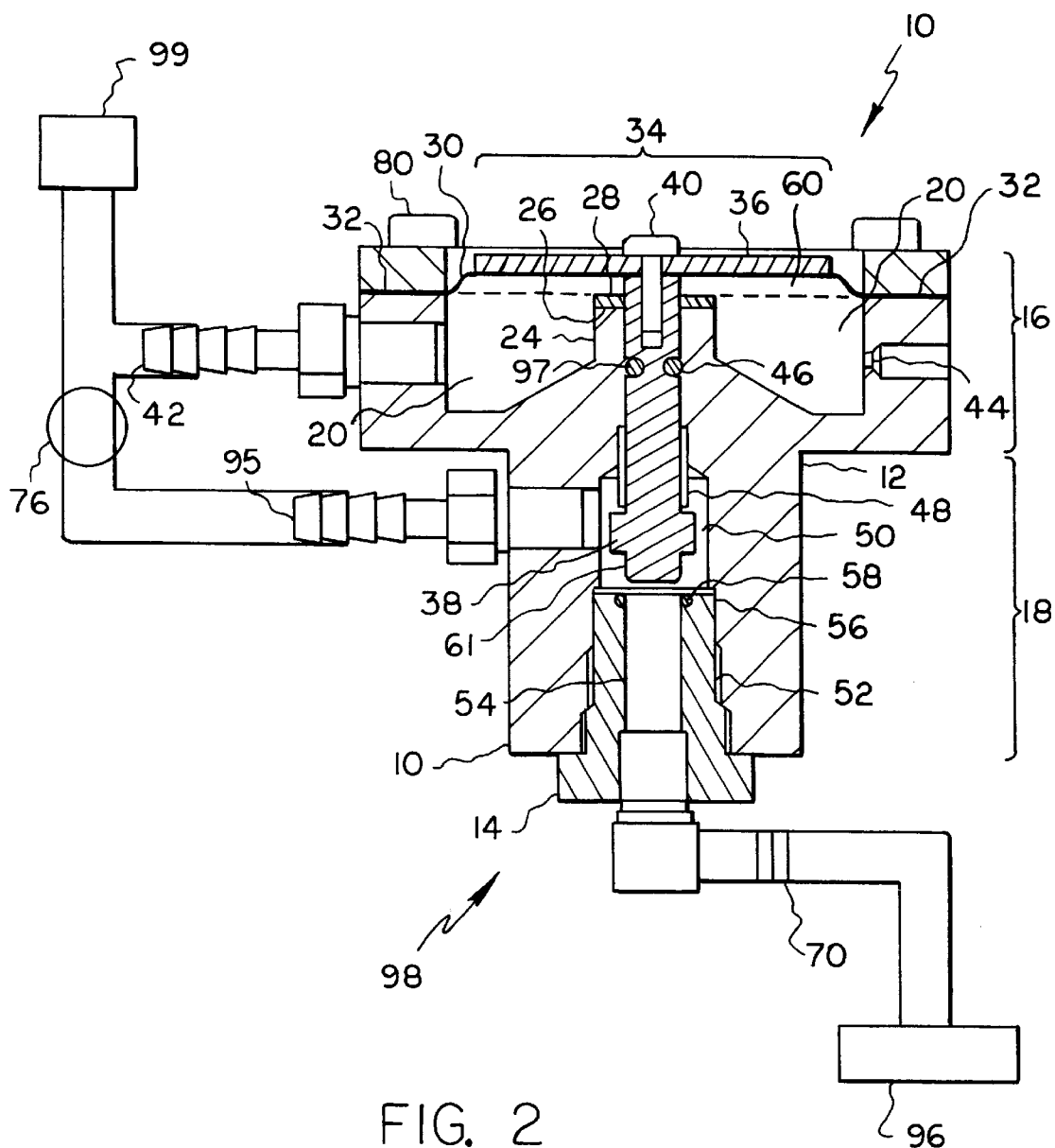
FIG. 2 is of view of FIG. 1 in the open position.

The movable shank 38, positioned within a cavity 97 of the stem 24, moves when the pressurized air, a portion thereof, from the manifold 99 exceeds a predetermined air pressure which is equal to the force applied to the center 34 of the diaphragm 30. The manifold 99 directs the pressurized air through conventional tubing 90 to a pressure inlet 42. The pressure inlet 42 shaped like a threaded or non-threaded sealer directs the pressurized air into the inlet pressure chamber 20. And if the pressurized air is greater than the forces applied to the center 34 of the diaphragm 30, then the pressurized air, as shown in FIG. 2, raises the diaphragm 30 to form the adjustable pressure chamber 60. In either scenario, the pressure chamber 20 directs the pressurized air to the pressure orifice 44. The orifice 44 has a predetermined aperture to maintain the pressurized air in the pressure chamber 20 to keep the adjustable pressure chamber 60 in the open position, FIG. 2, in view of a spring force 48.

The forces applied to the center 34, are determined at least by the mass of the washer 36, fastener apparatus 40, and the movable shaft 38; the spring-forces 48; and the friction induced by the movable shaft moving along o-rings 46, within the cavity 97, and the cavity 97. Accordingly, the forces applied to the center 34 can be adjusted accordingly by changing the mass, increase or decrease, or adding lubricants to increase or decrease the friction.

The cavity 97 has a sufficient diameter that allows the movable shaft 38 to move. Moreover, the cavity 97 ranges from the top surface 26 of the stem 24 to an air chamber 50 within the air assembly 18. The air chamber 50 also receives pressurized air from the manifold 99 through conventional tubing 90A and an air inlet 95. Accordingly, the pressurized air in the air chamber 50 could raise the movable shaft 38 through pressures applied through the cavity 97. To prevent the pressurized air from the air chamber 50 to form or assist in the formation of the adjustable pressure chamber 60, the cavity 97 has at least one set of conventional o-rings 46.

The air chamber 50 is defined as ranging from the o-rings 46 to the apex 56 of the seat 14. The seat 14 releasably fits within the threaded cavity 52, it can be non-threaded as well so long as the seat 14 is securely attached to the assembly 12 while the valve 10 operates, of the air assembly 18. Within the seat 14 is an air outlet cavity 54. The air outlet cavity 54 at the apex 56 receives a second o-ring 58, to keep the pressurized air in the air chamber 50 when the valve is closed as shown in FIG. 1, and then the nadir 61 of the moving shank 38 which fits securely within the cavity 54. When the nadir 61 is securely positioned within the cavity 54 —no adjustable pressure chamber 60 has been formed —, the pressurized air within the air chamber 50 is trapped within.

Likewise, when no adjustable pressure chamber 60 has been formed, the air within the bladders 96 is unable to escape through the manifold 99. Accordingly, the bladders 96 should retain the desired pressure.

When the adjustable pressure chamber 60 is formed, the pressurized air within the air chamber 50 proceeds into the air outlet cavity 54. From the air outlet cavity 54, the pressurized air is released from the valve 10 through an air outlet 70, a conventional threaded or non-threaded sealer. From the air outlet 70, the pressurized air enters conventional tubing 90B into at least one bladder 96. Desirably, the pressurized air from the air chamber 50 is greater than the air pressure within the bladder 96 so the pressurized air from the air chamber 50 will enter the bladder 96, rather than be re-directed into the valve 10.

An alternative embodiment of the present invention, could have a check valve 76 positioned between the manifold 99 and the valve 10. The check valve 76 would desirably prevent any air from the manifold 99 from entering the valve 10, or alternatively in the air chamber 50, unless a certain second predetermined air pressure was attained. The second predetermined air pressure may be greater, equal, or less than the air pressure requirement to form the adjustable pressure chamber 60.

Although a particular preferred embodiment of the invention has been illustrated and described in detail for illustrative purposes, it will be recognized that variations or modifications of the disclosed apparatus, including the rearrangement of parts, lie within the scope of the invention defined by the claims.

The embodiments of the invention in which an exclusive property or privilege is claimed are defined as follows:

I claim:

1. A pilot operated low pressure shut off valve used within a mattress unit, comprising:

an air inlet that receives and directs pressurized air, from a first conduit, into an air chamber then the pressurized air is directed through an air outlet into the mattress unit;

a pressure inlet that receives and directs the pressurized air, from a second conduit that is interconnected to the first conduit, toward a pressure chamber having a movable ceiling;

a cavity between the air chamber and the pressure chamber and within the cavity is a movable shank;

the movable shank has a top end, a shank portion which prevents the pressurized air from the air chamber and the pressure chamber from mixing together, and a bottom end, the top end is connected to an expandable diaphragm which forms at least a portion of the movable ceiling, the bottom end has a predetermined shaped to block the air outlet and when the bottom end is blocking the air outlet, the pressurized air is unable to enter the air outlet; and when the pressurized air within the pressure chamber is at or above a first predetermined air pressure the pressurized air within the pressure chamber moves the diaphragm away from the cavity which moves the bottom end of the movable shank from the air outlet so the pressurized air enters the air outlet and the mattress unit.

2. The valve of claim 1 wherein when the pressurized air is below the first predetermined air pressure, the pressurized air is unable to enter the adjustable pressure chamber or the air outlet.

3. The valve of claim 1 further comprising a check valve set to control whether the pressurized air has at least greater than a second predetermined air pressure, lower than the first predetermined air pressure, to enter the pressure inlet.

* * * * *